(12) United States Patent
Bonwick et al.

(10) Patent No.: US 7,743,225 B2
(45) Date of Patent: Jun. 22, 2010

(54) DITTO BLOCKS

(75) Inventors: Jeffrey S. Bonwick, Los Altos, CA (US); William H. Moore, Fremont, CA (US); Matthew A. Ahrens, San Francisco, CA (US)

(73) Assignee: Oracle America, Inc., Redwood City, CA (US)

( * ) Notice: Subject to any disclaimer, the term of this patent is extended or adjusted under 35 U.S.C. 154(b) by 1099 days.

(21) Appl. No.: 11/406,590

(22) Filed: Apr. 19, 2006

(65) Prior Publication Data

US 2007/0106862 A1 May 10, 2007

Related U.S. Application Data

(60) Provisional application No. 60/733,848, filed on Nov. 4, 2005.

(51) Int. Cl.
*G06F 12/00* (2006.01)
*G06F 13/00* (2006.01)
*G06F 13/28* (2006.01)

(52) U.S. Cl. .................................................... 711/162
(58) Field of Classification Search ........................ None
See application file for complete search history.

(56) References Cited

U.S. PATENT DOCUMENTS

| 4,144,522 | A | 3/1979 | Kageyama et al. |
|---|---|---|---|
| 5,129,085 | A | 7/1992 | Yamasaki et al. |
| 5,155,847 | A | 10/1992 | Kirouac et al. |
| 5,371,885 | A | 12/1994 | Letwin |
| 5,403,639 | A | 4/1995 | Belsan et al. |
| 5,410,667 | A | 4/1995 | Belsan et al. |
| 5,675,802 | A | 10/1997 | Allen et al. |
| 5,819,292 | A | 10/1998 | Hitz et al. |
| 5,893,919 | A * | 4/1999 | Sarkozy et al. ............... 711/114 |
| 6,209,111 | B1 | 3/2001 | Kadyk et al. |
| 6,289,356 | B1 * | 9/2001 | Hitz et al. .................... 707/201 |
| 6,341,341 | B1 | 1/2002 | Grummon et al. |
| 6,745,284 | B1 | 6/2004 | Lee et al. |
| 6,745,305 | B2 | 6/2004 | McDowell |
| 6,748,504 | B2 * | 6/2004 | Sawdon et al. ............... 711/162 |
| 6,795,966 | B1 | 9/2004 | Lim et al. |
| 6,829,617 | B2 | 12/2004 | Sawdon et al. |
| 6,857,001 | B2 | 2/2005 | Hitz et al. |
| 6,892,211 | B2 | 5/2005 | Hitz et al. |
| 7,007,196 | B2 | 2/2006 | Lee et al. |

(Continued)

OTHER PUBLICATIONS

Johnson, J. E. et al.; "Overview of the Spiralog File System", Digital Technical Journal, vol. 8, No. 2, 1996, pp. 5-14 (10 pages).

(Continued)

*Primary Examiner*—Sheng-Jen Tsai
*Assistant Examiner*—Matthew R Chrzanowski
(74) *Attorney, Agent, or Firm*—Osha • Liang LLP

(57) ABSTRACT

A method for storing a data block in a storage pool, including receiving a write operation for the data block, writing the data block into the storage pool, determining a first indirect block to store in the storage pool, wherein the first indirect block references the data block, writing the first indirect block to a first location in the storage pool, creating a copy of the first indirect block, and writing the copy of first indirect block to a second location in the storage pool.

15 Claims, 9 Drawing Sheets

U.S. PATENT DOCUMENTS

| | | | |
|---|---|---|---|
| 7,032,154 | B2 | 4/2006 | Kidorf et al. |
| 7,043,503 | B2* | 5/2006 | Haskin et al. ............... 707/200 |
| 7,043,677 | B1 | 5/2006 | Li |
| 7,085,785 | B2* | 8/2006 | Sawdon et al. ............. 707/204 |
| 7,133,964 | B2 | 11/2006 | Rodrigues et al. |
| 7,162,486 | B2 | 1/2007 | Patel et al. |
| 7,174,352 | B2 | 2/2007 | Kleiman et al. |
| 7,200,715 | B2 | 4/2007 | Kleiman et al. |
| 7,334,094 | B2* | 2/2008 | Fair ........................... 711/161 |
| 7,424,497 | B1* | 9/2008 | Leverett et al. ............. 707/204 |
| 7,451,168 | B1* | 11/2008 | Patterson .................... 707/206 |
| 7,526,622 | B1* | 4/2009 | Bonwick et al. ............ 711/162 |
| 7,555,504 | B2* | 6/2009 | Bixby et al. ................. 707/203 |
| 2002/0004883 | A1 | 1/2002 | Nguyen et al. |
| 2002/0055942 | A1 | 5/2002 | Reynolds |
| 2002/0087788 | A1 | 7/2002 | Morris |
| 2002/0161972 | A1 | 10/2002 | Talagala et al. |
| 2003/0033477 | A1 | 2/2003 | Johnson et al. |
| 2003/0126107 | A1 | 7/2003 | Yamagami |
| 2003/0145167 | A1 | 7/2003 | Tomita |
| 2003/0158863 | A1* | 8/2003 | Haskin et al. ............... 707/200 |
| 2004/0078533 | A1* | 4/2004 | Lee et al. .................... 711/162 |
| 2004/0098720 | A1 | 5/2004 | Hooper |
| 2004/0107314 | A1 | 6/2004 | Kim et al. |
| 2004/0117567 | A1* | 6/2004 | Lee et al. .................... 711/154 |
| 2004/0123063 | A1 | 6/2004 | Dalal et al. |
| 2004/0225834 | A1 | 11/2004 | Lu et al. |
| 2004/0234000 | A1 | 11/2004 | Page |
| 2004/0268068 | A1* | 12/2004 | Curran et al. ............... 711/162 |
| 2005/0010620 | A1 | 1/2005 | Silvers et al. |
| 2005/0027956 | A1* | 2/2005 | Tormasov et al. .......... 711/162 |
| 2005/0066095 | A1* | 3/2005 | Mullick et al. .............. 710/200 |
| 2005/0097270 | A1 | 5/2005 | Kleiman et al. |
| 2005/0235154 | A1 | 10/2005 | Serret-Avila |
| 2005/0246397 | A1* | 11/2005 | Edwards et al. ............. 707/204 |
| 2005/0246503 | A1* | 11/2005 | Fair ........................... 711/147 |
| 2006/0168409 | A1 | 7/2006 | Kahn et al. |
| 2006/0179261 | A1* | 8/2006 | Rajan ........................ 711/162 |
| 2006/0218644 | A1 | 9/2006 | Niles et al. |
| 2006/0256965 | A1 | 11/2006 | Rowe |
| 2007/0106868 | A1* | 5/2007 | Moore et al. ................ 711/170 |

OTHER PUBLICATIONS

Santry, D. S. et al.; "Deciding When to Forget in the Elephant File System"; 17th ACM Symposium on Operating Systems Principles (SOSP '99), Dec. 1999; pp. 110-123 (14 pages).

Chutani, S. et al., "The Episode File System"; Proceedings of the 1992 USENIX Winter Technical Conference; 1992; (18 pages).

Seltzer, M. L.; "File System Performance and Transaction Support"; University of California at Berkeley, 1992 (131 pages).

Sandberg, R. et al.; "Design and Implementation of the Sun Network Filesystem"; Sun Microsystems, Inc., 1985 USENIX Conference (12 pages).

McKusick, M. K. et al.; "A Fast File System for UNIX"; ACM Transaction on Computer Systems, vol. 2, No. 3, Aug. 1984, pp. 181-197 (17 pages).

Astrahan, M.M. et al.; "System R: Relational Approach to Database Management"; ACM Transactions on Database Systems; vol. 1, No. 2, Jun. 1976, pp. 97-137 (41 pages).

"VERITAS File System 3.4 Administrator's Guide" VERITAS Software Corporation, Nov. 2000, http://www,veritas.com; pp. 1-227 (227 pages).

Czezatke C. et al.; "Linlogfs: A Log-Structured Filesystem for Linux"; The USENIX Association, Proceedings of FREENIX Track: 2000 USENIX Annual Technical Conference, San Diego, California, Jun. 18-23, 2000 (13 pages).

Osorio, N. et al.; "Guidelines for Using Snapshot Storage Systems for Oracle Databases"; Oracle Corporation, Oct. 2001 (13 pages).

Quinlan, S.; "A Cached WORM File System"; AT&T Bell Laboratories, Murry Hill, New Jersey; Software-Practice and Experience, vol. 21(12), pp. 1289-1299, Dec. 1991 (11 pages).

Sun StorEdge Instant Image 2.0 System Administrator's Guide; Sun Microsystems, Inc., Feb. 2000, Revision A (106 pages).

Ylonen, T.; "Concurrent Shadow Paging: A New Direction for Database Research"; Laboratory of Information Processing Science, Helsinki University of Technology, SF-02150, Espoo, Finland, 1992 (8 pages).

Popek, G. et al.; "The Locus Distributed System Architecture"; The MIT Press, Cambridge, Massachusetts, 1985 The Massachusetts Institute of Technology (8 pages).

Gray, J. et al.; "The Recovery Manager of the System R Database Manager"; Computing Surveys, vol. 13, No. 2, Jun. 1981 (20 pages).

Schilling, J.; "Enrwurf und Implementierung eines schnellen Filesystems fur Unix unter besonderer Berucksichtigung der technischen Parameter optischer Speichermedien und multimedialer Anwendungen"; Diplomarbeir Jorg Schilling, eingereicht am May 23, 1991 an der TU Berlin, and English Translation (245 pages).

Ylonen, T.; "Concurrent Shadow Paging: Snapshots, Read-Only Transactions, and On-The-Fly Multi-Level Incremental Dumping"; Laboratory of Information Processing Science, Helsinki University of Technology, FIN-02150, Espoo, Finland, 1993 (22 pages).

"The Enterprise Challenge Served by Snapshot"; Whitepaper, 2001 LSI Logic Corporation (8 pages).

Angrawal, R. et al.; "Integrated Concurrency Control and Recovery Mechanisms: Design and Performance Evaluation"; ACM Transactions on Database Systems, vol. 10, No. 4, Dec. 1985, pp. 529-564 (36 pages).

Suresh, Babu S.; "Persistent Snapshots"; Department of Computer Science and Automation, Indian Institute of Science, Bangalore—560 012, Jan. 2000 (38 pages).

Borg, A. et al.; "Fault Tolerance Under UNIX"; ACM Transactions on Computer Systems, vol. 7, No. 1, Feb. 1989, pp. 1-24 (24 pages).

Rosenblum, M. et al.; "The Design and Implementation of a Log-Structured File System"; Electrical Engineering and Computer Sciences, Computer Science Division, University of California, 1991 (15 pages).

Hecht, M. S. et al.; "Shadowed Management of Free Disk Pages with a Linked List"; ACM Transactions on Database Systems, vol. 8, No. 4, Dec. 1983, pp. 503-514 (12 pages).

Rosenblum, M. et al.; "The LFS Storage Manager" Computer Science Division, Electrical Engineering and Computer Sciences, University of California; presented at the Summer '90 USENIX Technical Conference, Anaheim, California, Jun. 1990 (16 pages).

Lorie, R. A.; "Physical Integrity in a Large Segmented Database"; ACM Transactions on Database Systems, vol. 2, No. 1, Mar. 1977, pp. 91-104 (14 pages).

Austin, B.; "*A Dynamic Disc Allocation Algorithm Designed to Reduce Fragmentation During File Reloading*"; Information Sciences Laboratory, Corporate Research and Development Center, General Electric Company, 1970: pp. 378-381 (4 pages).

Goodheart, B. et al.; "*The Magic Garden Explained*"; Prentice Hall, 1994; pp. 24-25, 29-30, 390-391 (8 pages).

Stallings, W.; "*Computer Organization and Architecture: Designing for Performance*"; Prentice Hall, 2000; pp. 377-378 (4 pages).

"Proceedings of the 5th Annual Linux Showcase & Conference" USENIX Association, Oakland, California, Nov. 5-10, 2001 (11 pages).

\* cited by examiner

DITTO BLOCKS

CROSS REFERENCE TO RELATED APPLICATIONS

This application claims benefit of U.S. Provisional Application Ser. No. 60/733,848 filed on Nov. 4, 2005, entitled "Multiple Replication Levels with Pooled Devices" in the names of William H. Moore, Jeffrey S. Bonwick, and Matthew A. Ahrens, which is incorporated by reference.

The present application contains subject matter that may be related to the subject matter in the following U.S. patent applications, which are all assigned to a common assignee: "Method and Apparatus for Self-Validating Checksums in a File System" (application Ser. No. 10/828,573) flied on Apr. 24, 2004; "Method and Apparatus for Dynamic Striping" (application Ser. No. 10/828,677) filed on Apr. 21, 2004; "Method and Apparatus for Vectored Block-Level Checksum for File System Data Integrity" (application Ser. No. 10/828, 715) filed on Apr. 21, 2004; "Method and Apparatus for Identifying Tampering of Data in a File System" (application Ser. No. 10/853,874) filed on May 26, 2004; "Method and System for Detecting and Correcting Data Errors Using Checksums and Replication" (application Ser. No. 10/853, 837) filed on May 26, 2004; "Method and System for Detecting and Correcting Data Errors Using Data Permutations" (application Ser. No. 10/853,870) filed on May 26, 2004; "Method and Apparatus for Compressing Data in a File System" (application Ser. No. 10/853,868) filed on May 26, 2004; "Gang Blocks" (application Ser. No. 10/919,878) filed on Aug. 17, 2004; "Method and Apparatus for Enabling Adaptive Endianness" (application Ser. No. 10/919,886) filed on Aug. 17, 2004; "Automatic Conversion of All-Zero Data Storage Blocks into File Holes" (application Ser. No. 10/853, 915) filed on May 26, 2004; "Multiple Replication Levels with Pooled Devices" (application Ser. No. 60/733,848) filed on Nov. 4, 2005; "Method and System for Data Replication" (application Ser. No. 11/434,296) filed on May 15, 2006; Multiple Replication Levels with Pooled Devices (application Ser. No. 11/406,956) filed on Apr. 19, 2006; "Method and System Supporting Per-File and Per-Block Replication" (application Ser. No. 11/406,850) filed on Apr. 19, 2006; and "Method and System for Adaptive Metadata Replication" (application Ser. No. 11/406,957) filed on Apr. 19, 2006.

BACKGROUND

A typical operating system includes a file system. In general, the file system provides a mechanism for the storage and retrieval of files and a hierarchical directory structure for the naming of multiple files. More specifically, the file system stores information provided by the user (i.e., data) and information describing the characteristics of the data (i.e., metadata). The file system also provides extensive programming interfaces to enable the creation and deletion of files, reading and writing of files, performing seeks within a file, creating and deleting directories, managing directory contents, etc. In addition, the file system also provides management interfaces to create and delete file systems. File systems are typically controlled and restricted by operating system parameters. For example, most operating systems limit the maximum number of file names that can be handled within their file system. Some operating systems also limit the size of files that can be managed under a file system.

Files in a file system may be replicated using one or more replication schemes. Replication schemes are typically used to recover data in the event of file system failures, data corruption, etc. Data replication ensures continuous availability and protection of files in the file system. Examples of replication schemes include Redundant Array of Inexpensive Disks (RAID)-5, 2-way mirroring, and 3-way mirroring.

SUMMARY

In general, in one aspect, the invention relates to a method for storing a data block in a storage pool, comprising receiving a write operation for the data block, writing the data block into the storage pool, determining a first indirect block to store in the storage pool, wherein the first indirect block references the data block, writing the first indirect block to a first location in the storage pool, creating a copy of the first indirect block, and writing the copy of first indirect block to a second location in the storage pool.

In general, in one aspect, the invention relates to a method for reading data, comprising obtaining a first location of a first indirect block from a parent block, determining whether the first indirect block can be retrieved from the first location, if the first indirect block cannot be retrieved from the first location, obtaining a second location of the first indirect block from the parent block, and retrieving the first indirect block from the second location, and retrieving the first indirect block from the first location, if the first indirect block can be retrieved from the first location.

In general, in one aspect, the invention relates to a computer usable medium comprising computer readable program code embodied therein for causing a computer system to: receive a write operation for the data block, write the block into the storage pool, determine a first indirect block to store in the storage pool, wherein the first indirect block references the data block, and write the first indirect block to a first location in the storage pool, create a copy of the first indirect block, write the copy of first indirect block to a second location in the storage pool.

Other aspects of the invention will be apparent from the following description and the appended claims.

DETAILED DESCRIPTION

Figure 1:
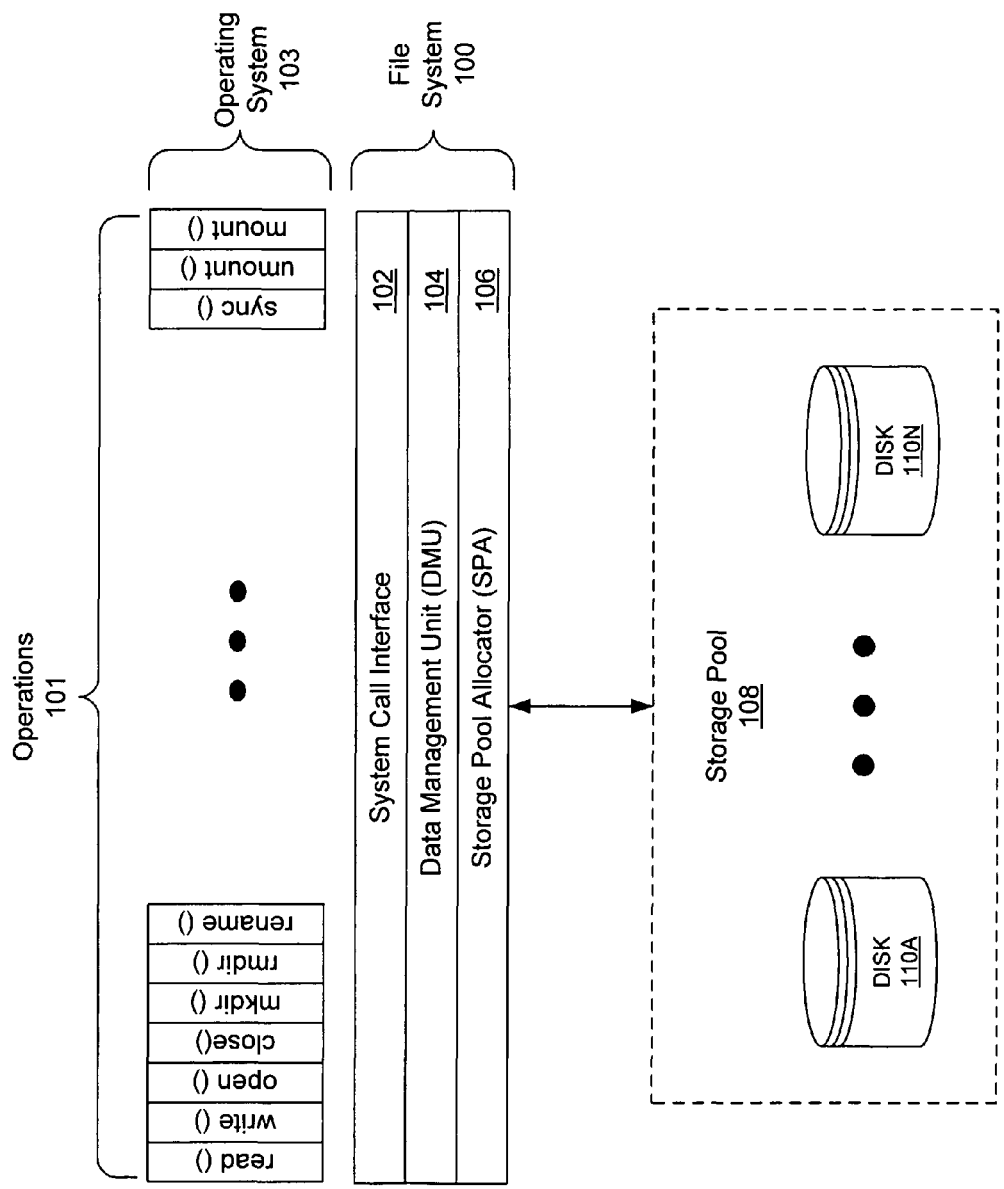
FIG. 1 shows a system architecture in accordance with an embodiment of the invention.

Specific embodiments of the invention will now be described in detail with reference to the accompanying figures. Like elements in the various figures are denoted by like reference numerals for consistency. Further, the use of "ST" in the drawings is equivalent to the use of "Step" in the detailed description below.

In the following detailed description of one or more embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

FIG. 1 shows a system architecture in accordance with one embodiment of the invention. The system architecture includes an operating system (103) interacting with a file system (100), which in turn interfaces with a storage pool (108). In one embodiment of the invention, the file system (100) includes a system call interface (102), a data management unit (DMU) (104), and a storage pool allocator (SPA) (106).

The operating system (103) typically interfaces with the file system (100) via a system call interface (102). The operating system (103) provides operations (101) for users to access files within the file system (100). These operations (101) may include read, write, open, close, etc. In one embodiment of the invention, the file system (100) is an object-based file system (i.e., both data and metadata are stored as objects). More specifically, the file system (100) includes functionality to store both data and corresponding metadata in the storage pool (108). Thus, the aforementioned operations (101) provided by the operating system (103) correspond to operations on objects.

In one embodiment of the invention, a request to perform a particular operation (101) (i.e., a transaction) is forwarded from the operating system (103), via the system call interface (102), to the DMU (104). In one embodiment of the invention, the DMU (104) translates the request to perform an operation on an object directly to a request to perform a read or write operation at a physical location within the storage pool (108). More specifically, the DMU (104) represents the objects as data blocks and indirect blocks as described in FIG. 3 below. Additionally, in one embodiment of the invention, the DMU (104) includes functionality to group related work (i.e., modifications to data blocks and indirect blocks) into I/O requests (referred to as a "transaction group") allowing related blocks to be forwarded to the SPA (106) together. The SPA (106) receives the transaction group from the DMU (104) and subsequently writes the blocks into the storage pool (108). The operation of the SPA (106) is described in FIG. 2 below.

In one embodiment of the invention, the storage pool (108) includes one or more physical disks (disks (110A-110N)). Further, in one embodiment of the invention, the storage capacity of the storage pool (108) may increase and decrease dynamically as physical disks are added and removed from the storage pool. In one embodiment of the invention, the storage space available in the storage pool (108) is managed by the SPA (106).

Figure 2:
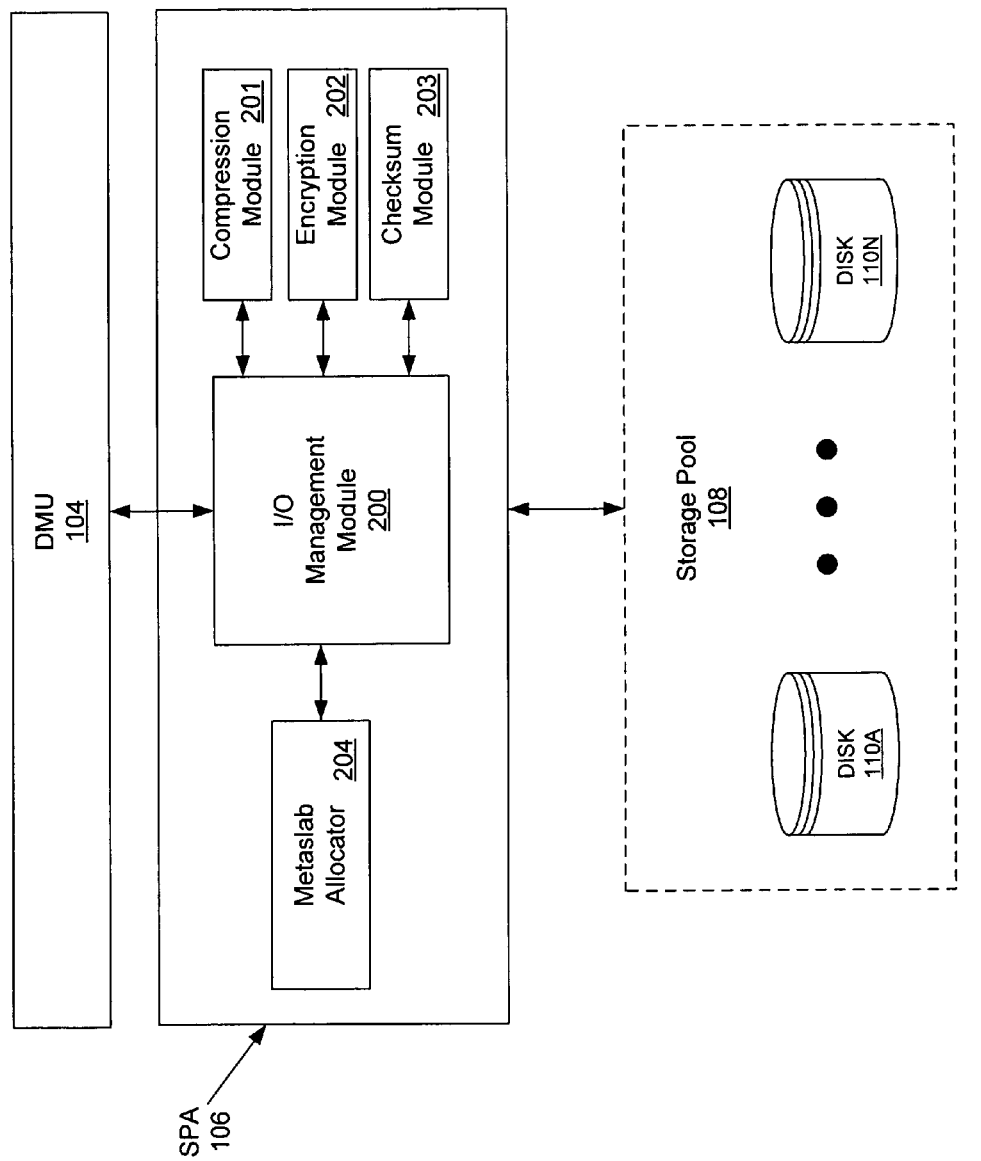
FIG. 2 shows a storage pool allocator in accordance with an embodiment of the invention.

FIG. 2 shows the SPA (106) in accordance with one embodiment of the invention. The SPA (106) may include an I/O management module (200), a compression module (201), an encryption module (202), a checksum module (203), and a metaslab allocator (204). Each of these aforementioned modules are described in detail below.

As noted above, the SPA (106) receives transactions from the DMU (104). More specifically, the I/O management module (200), within the SPA (106), receives transactions from the DMU (104) and groups the transactions into transaction groups in accordance with one embodiment of the invention. The compression module (201) provides functionality to compress larger logical blocks (i.e., data blocks and indirect blocks) into smaller segments, where a segment is a region of physical disk space. For example, a logical block size of 8K bytes may be compressed to a size of 2K bytes for efficient storage. Further, in one embodiment of the invention, the encryption module (202) provides various data encryption algorithms. The data encryption algorithms may be used, for example, to prevent unauthorized access. In one embodiment of the invention, the checksum module (203) includes functionality to calculate a checksum for data (i.e., data stored in a data block) and metadata (i.e., data stored in an indirect block) within the storage pool. The checksum may be used, for example, to ensure that the data and/or the metadata has not been corrupted.

As discussed above, the SPA (106) provides an interface to the storage pool and manages allocation of storage space within the storage pool (108). More specifically, in one embodiment of the invention, the SPA (106) uses the metaslab allocator (204) to manage the allocation of storage space in the storage pool (108).

In one embodiment of the invention, the storage space in the storage pool (108) is divided into contiguous regions of data, i.e., metaslabs. The metaslabs may in turn be divided into segments (i.e., portions of the metaslab). The segments may all be the same size, or alternatively, may be a range of sizes. The metaslab allocator (204) includes functionality to allocate large or small segments to store data blocks and indirect blocks. In one embodiment of the invention, allocation of the segments within the metaslabs is based on the size of the blocks within the I/O requests. That is, small segments are allocated for small blocks, while large segments are allocated for large blocks. The allocation of segments based on the size of the blocks may allow for more efficient storage of data and metadata in the storage pool by reducing the amount of unused space within a given metaslab. Further, using large segments for large blocks may allow for more efficient access to data (and metadata) by reducing the number of DMU (104) translations and/or reducing the number of I/O operations. In one embodiment of the invention, the metaslab allocator (204) may include a policy that specifies a method to allocate segments.

Figure 3:
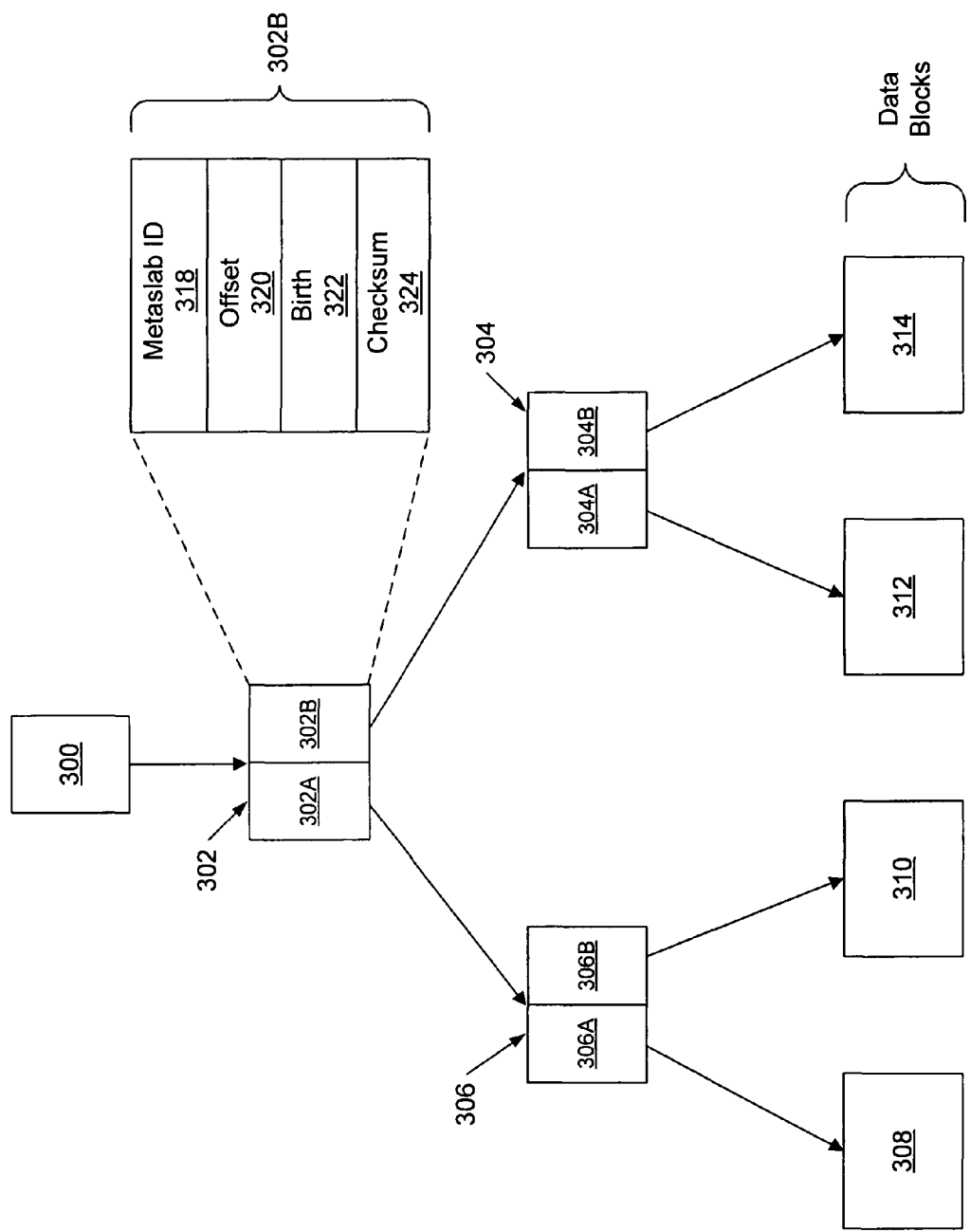
FIG. 3 shows a hierarchical data configuration in accordance with an embodiment of the invention.

As noted above, the storage pool (108) is divided into metaslabs, which are further divided into segments. Each of the segments within the metaslab may then be used to store a data block (i.e., data) or an indirect block (i.e., metadata). FIG. 3 shows the hierarchical data configuration (hereinafter referred to as a "tree") for storing data blocks and indirect blocks within the storage pool in accordance with one embodiment of the invention. In one embodiment of the invention, the tree includes a root block (300), one or more levels of indirect blocks (302, 304, 306), and one or more data blocks (308, 310, 312, 314). In one embodiment of the invention, the location of the root block (300) is in a particular location within the storage pool. The root block (300) typically points to subsequent indirect blocks (302, 304, and 306). In one embodiment of the invention, indirect blocks (302, 304, and 306) may be arrays of block pointers (e.g., 302A, 302B, etc.) that, directly or indirectly, reference to data blocks (308, 310, 312, and 314). The data blocks (308, 310, 312, and 314) contain actual data of files stored in the storage pool. One skilled in the art will appreciate that several layers of indirect blocks may exist between the root block (300) and the data blocks (308, 310, 312, 314).

In contrast to the root block (300), indirect blocks and data blocks may be located anywhere in the storage pool (108 in FIG. 1). In one embodiment of the invention, the root block (300) and each block pointer (e.g., 302A, 302B, etc.) includes data as shown in the expanded block pointer (302B). One skilled in the art will appreciate that data blocks do not include this information; rather data blocks contain actual data of files within the file system.

In one embodiment of the invention, each block pointer includes a metaslab ID (318), an offset (320) within the metaslab, a birth value (322) of the block referenced by the block pointer, and a checksum (324) of the data stored in the block (data block or indirect block) referenced by the block pointer. In one embodiment of the invention, the metaslab ID (318) and offset (320) are used to determine the location of the block (data block or indirect block) in the storage pool. The metaslab ID (318) identifies a particular metaslab. More specifically, the metaslab ID (318) may identify the particular disk (within the storage pool) upon which the metaslab resides and where in the disk the metaslab begins. The offset (320) may then be used to reference a particular segment in the metaslab. In one embodiment of the invention, the data within the segment referenced by the particular metaslab ID (318) and offset (320) may correspond to either a data block or an indirect block. If the data corresponds to an indirect block, then the metaslab ID and offset within a block pointer in the indirect block are extracted and used to locate a subsequent data block or indirect block. The tree may be traversed in this manner to eventually retrieve a requested data block.

In one embodiment of the invention, copy-on-write transactions are performed for every data write request to a file. Specifically, all write requests cause new segments to be allocated for the modified data. Therefore, the retrieved data blocks and indirect blocks are never overwritten (until a modified version of the data block and indirect block is committed). More specifically, the DMU writes out all the modified data blocks in the tree to unused segments within the storage pool. Subsequently, the DMU writes out the corresponding block pointers (within indirect blocks) to unused segments in the storage pool. In one embodiment of the invention, fields (i.e., metaslab ID, offset, birth, checksum) for the corresponding block pointers are populated by the DMU prior to sending an I/O request to the SPA. The indirect blocks containing the block pointers are typically written one level at a time. To complete the copy-on-write transaction, the SPA issues a single write that atomically changes the root block to reference the indirect blocks referencing the modified data block.

Figure 4:
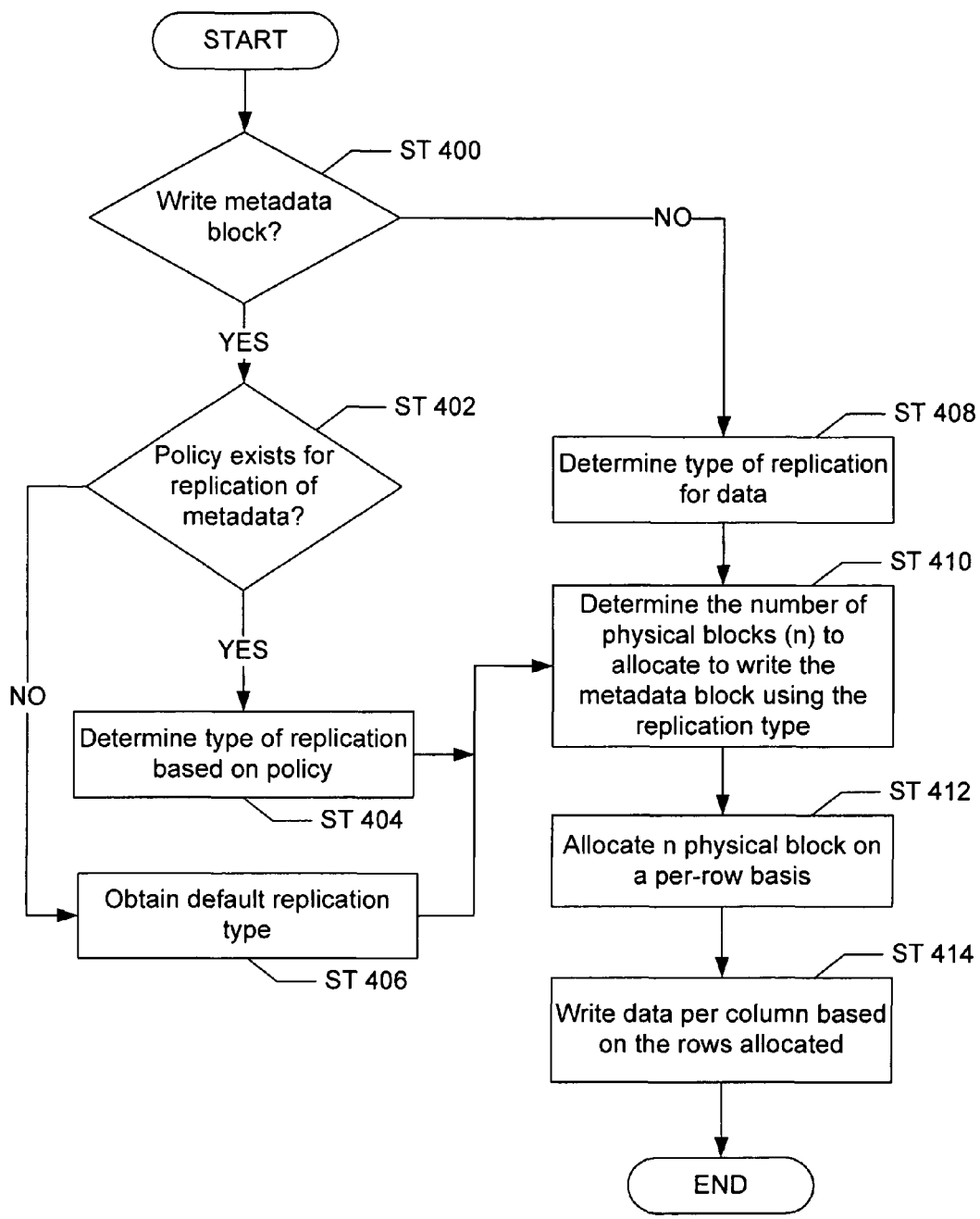
FIGS. 4-6 show flow charts in accordance with an embodiment of the invention.

Using the infrastructure shown in FIGS. 1-3, the following discussion describes a method for writing metadata (i.e., indirect blocks) based on a replication scheme. Specifically, embodiments of the invention are directed toward writing metadata using a double-wide replication policy. FIG. 4 shows a flow chart for writing data and metadata to disk in accordance with one embodiment of the invention. Initially, a determination is made about whether the write operation received corresponds to an operation to write metadata or data (Step 400). If the write operation corresponds to an operation to write metadata, then a determination is made as to whether a replication policy exists for metadata (Step 402). For example, the logical block may be associated with a block level replication policy, a file level replication policy, or a file system level replication policy.

In one embodiment of the invention, the block level policy corresponds to a replication policy with a granularity of a block. Thus, the policy specifies how a block is to be replicated. In one embodiment of the invention, a file level policy corresponds to a replication policy with a granularity of a file. Thus, all blocks that are associated with a given file are replicated in accordance with the file's replication policy. In one embodiment of the invention, the file system policy corresponds to a replication policy with a granularity of a file system. Thus, all files within the file system are replicated in accordance with the file system's policy.

Continuing with FIG. 4, if a replication policy for metadata exists, then the replication policy is analyzed to determine the replication type (e.g., 2-way mirroring, 3-way mirroring, or a RAID scheme, etc.) (Step 404). Alternatively, if a replication policy for metadata does not exist, then a default policy may be used to determine the replication type for the metadata (Step 406). Once the replication type is determined (using Step 404 or Step 406), the process proceeds to Step 410 (described below).

Returning to Step 400, if the write operation does not correspond to an operation to write metadata (i.e., the write operation corresponds to an operation to write data), then the replication type for the data is determined (Step 408). Once the type of replication is determined, the process proceeds to Step 410. At Step 410, the number of blocks that need to be allocated on disk is computed using, among other information, the replication type (Step 410). The steps involved in determining the number of physical blocks to allocated on disk is discussed below in FIG. 5. Once the number of physical blocks to allocate the number of physical blocks is allocated in the storage pool on a per-row basis (Step 412). For example, if there are five disks in the storage pool and eight physical blocks need to be allocated, then two rows are required. The first row includes five of the eight physical blocks and the second row includes the remaining three physical blocks. In one embodiment of the invention, the logical block (or more specifically the data in the logical block) is written into the allocated physical blocks column-first (Step 412). That is, although physical blocks are allocated using rows, the rows are filled in on a per-column basis when the logical block is written to disk. Using the eight block example from above, physical blocks in the first three columns are written to prior to writing to the remaining physical blocks in columns 4 and 5.

In one embodiment of the invention, the method described above in FIG. 4 allows per-file, per-block replication. That is, embodiments of the invention allow for greater control over how each block written to disk is replicated. For example, each block written to disk can be replicated in a different manner than the previous block or the next block written to disk. Alternatively, all the blocks corresponding to one file may be written using the same replication type. In addition, metadata and data blocks can be written using different replication types, depending on the importance of the data in each block. In one embodiment of the invention, the replication type for each block (data or metadata) is stored in a block pointer (either associated with an indirect block or a root block) referencing the block. Thus, by reading the block pointer referencing a block (where the referenced block may be an indirect block or a data block), the replication type and the starting address of the block can be obtained.

The aforementioned functionality to perform per-file, per-block replication allows users to specify the granularity of the replication policies implemented by the system. For example, the user may be able to specify per-file system, per-file, or per-block replication policies.

Further, per-file, per-block replication permits a simple and easy method for changing replication policies. More specifically, if the replication policy is changed on-the-fly, then the user/administrator gives the file system a command indicating that the replication policy has changed, and any new data that is written to disk is written using the new replication policy. Said another way, using the copy-on-write feature of the present invention, any new blocks written to disk may be written using the new replication policy, without affecting old data already written to disk using a different replication policy.

In one embodiment of the invention, per-file, per-block replication permits replication of a class of data at a higher standard than the rest of the data. For example, as described below, all metadata may be replicated using a double-wide replication policy, while data may be replicated using a lower standard of replication.

Figure 5:
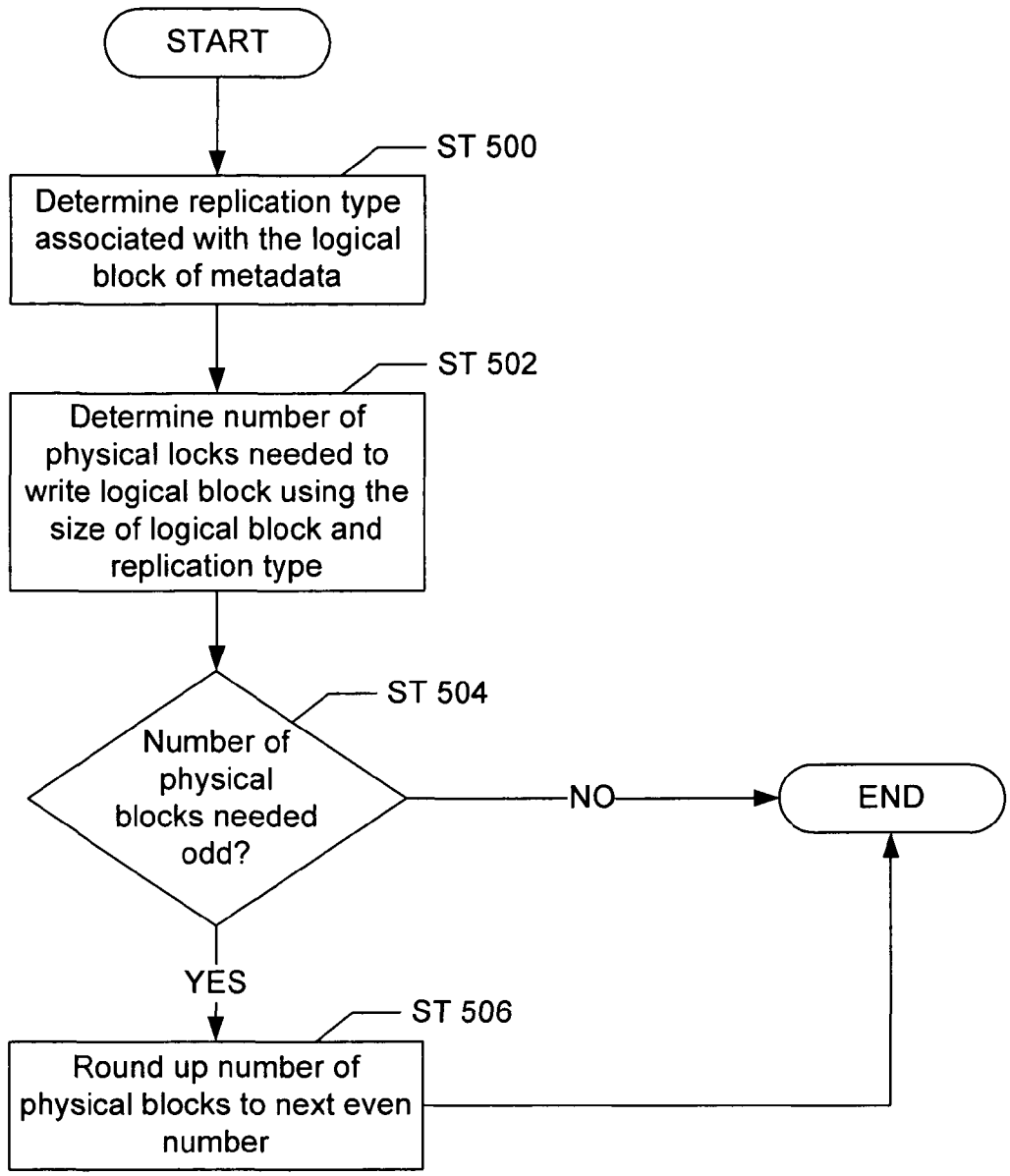

FIG. 5 shows a flow chart showing a method for allocating blocks on disk in accordance with one embodiment of the invention. Specifically, FIG. 5 describes the method corresponding to Step 410 of FIG. 4 in accordance with one embodiment of the invention. Initially, the replication type to use to write the logical block of metadata is determined using the replication policy (Step 500). Subsequently, the number of blocks needed to write the logical data to disk is computed using the size of the logical block and the replication type (Step 502). In one embodiment of the invention, the size of logical data corresponds to the number of physical blocks required to write the logical block to disk. In one embodiment of the invention, a single logical block may correspond to more than one physical block (e.g., data block (314) in FIG. 3 may correspond to 1K of data, in which case the single logical block (314) is actually two physical blocks on disk assuming that each individual physical block is 512 bytes).

In one embodiment of the invention, the number of blocks to allocate is computed as a function of the physical size of the data and the replication type used to write the logical block to disk. For example, if the logical block is to be written to disk using a RAID scheme, then the number of physical blocks to allocate is determined by summing the number of physical blocks required to write the logical block into the storage pool and an appropriate number of parity blocks (i.e., physical blocks used to store parity data associated with one or more of the physical blocks). Alternatively, if the size of the logical block is 2K and the replication type is three-way mirroring, then twelve physical blocks would be allocated in the storage pool. Those skilled in the art will appreciate that some logical blocks in the storage pool may not be replicated, in which case physical blocks allocated on disk would correspond directly to the size of the logical block.

At this stage, the number of physical blocks that need to be allocated has been determined, however, the number of physical blocks that need to be allocated may need to be increased to prevent (or mitigate) fragmentation in file system. In one embodiment of the invention, to determine if the number of physical blocks that need to be allocated is sufficient, a determination is made whether the number of blocks computed is odd (Step 504). If the number of blocks computed is odd, then the number of blocks to allocate is rounded up to the next even number (Step 506). In one embodiment of the invention, the number of blocks allocated is rounded up to an even number to prevent fragmentation. That is, because most replication types require at least two physical blocks, fragmentation of data (i.e., where contiguous physical blocks of data are not allocated for logical blocks) is prevented by restricting the allocation size to even numbers. Alternatively, if the number of blocks computed is even, then the allocated blocks are used to write the data to disk as described above in FIG. 4.

Figure 6:
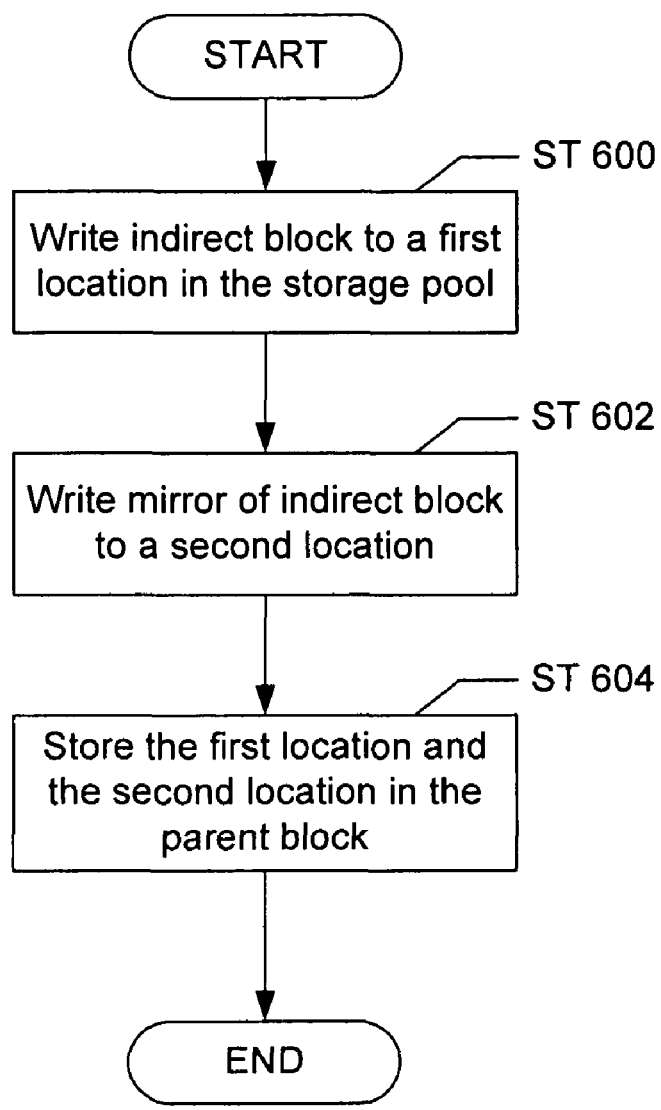

As described above, a particular class of data may be replicated using a higher standard replication policy than other classes of data stored in the file system. The present invention focuses on the replication of metadata (i.e., indirect blocks) using a different replication policy than data (i.e., data blocks). FIG. 6 shows a flow chart for replicating metadata using a double-wide policy in accordance with one embodiment of the invention. In one embodiment of the invention, the double-wide policy is a two-way mirroring replication policy, in which each indirect block is written to two distinct locations in the storage pool.

Initially, an indirect block is written to a first location within the storage pool (Step 600). Subsequently, a mirror of the indirect block is written to a second location within the storage pool (Step 602). Said another way, a copy of the indirect block is created, and the copy of the indirect block is written to a second location within the storage pool. Using the double-wide replication policy, for a single block of metadata, two I/O writes are issued. Those skilled in the art will appreciate that the first and second location may be anywhere within the storage pool (e.g., on different disks in the storage pool, on the same disk, etc.). In one embodiment of the invention, both the first location and the second location contain the same metadata information. That is, because an indirect block is a block pointer that references at least one other child block (i.e., where a child block is either another indirect block or a data block), both locations in which the indirect block is stored reference the same child block(s). Finally, both the first location and the second location are stored in the parent block of the indirect block (i.e., where the parent block is either an indirect block or a root block) (Step 604). In one embodiment of the invention, the first location and the second location of the indirect block are stored in the block pointer of the parent block.

Figure 7:
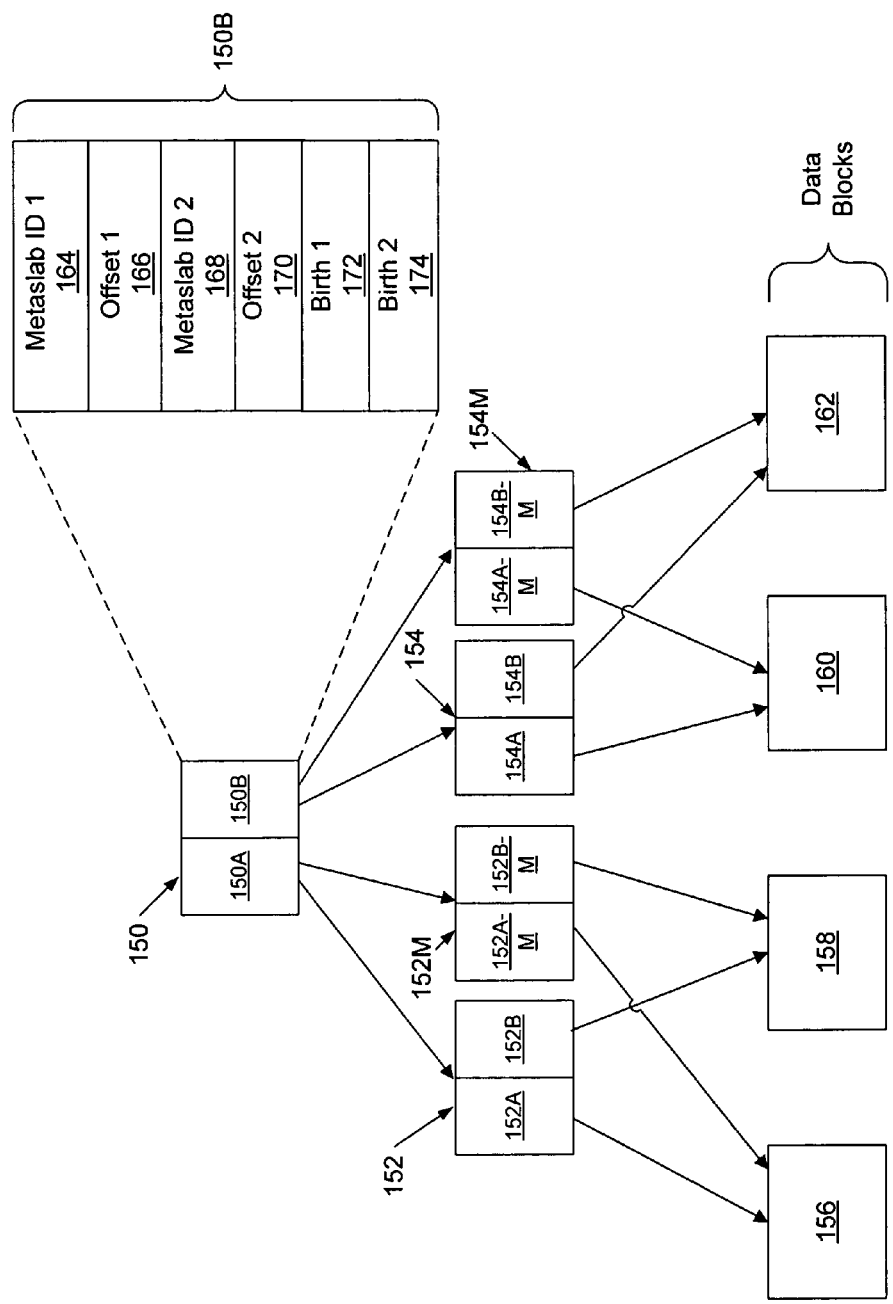
FIG. 7 shows a hierarchical data configuration in accordance with an embodiment of the invention.

FIG. 7 shows a hierarchical data configuration for storing indirect blocks using a double-wide policy in accordance with one embodiment of the invention. Specifically, FIG. 6 shows a root block (150), indirect blocks (152, 154), and data blocks (156, 158, 160, 162). The indirect blocks (152, 154) are replicated using a double-wide policy. More specifically, when indirect blocks (152, 152) are stored, mirrors of the indirect blocks (i.e., 152M, 152M) are also stored. As described above, indirect blocks (152 and 154) may be stored in different locations on different disks than indirect blocks (152M and 154M). In one embodiment of the invention, block pointers 152A and 152A-M reference the same data block (156). Similarly, block pointers 152B and 152B-M reference data block (158), block pointers 154A and 154A-M reference data block (160), and block pointers 154B and 154B-M reference data block (162).

Further, both locations of the indirect blocks (152 and 154) are stored in the corresponding block pointer in the parent block. Thus, in the example shown in FIG. 7, root block 150 includes two block pointers (150A, 150B), where each of the aforementioned block pointers points to both copies of the appropriate indirect block. Specifically, as shown in the blown up block pointer (150B), both locations of indirect block (154 and 154M) are stored as <Metaslab ID 1 (164), Offset 1 (166)> and <Metaslab ID 2 (168), Offset 2 (170)>. Further, the birth times of both indirect blocks (154 and 154M) are also stored in the root block (150B). Those skilled in the art will appreciate that indirect blocks (152 and 154) and their corresponding mirror copies (152M and 154M) may be considered to be born at the same time, in which case only one birth time may be stored in the block pointer of the corresponding parent block.

Figure 8:
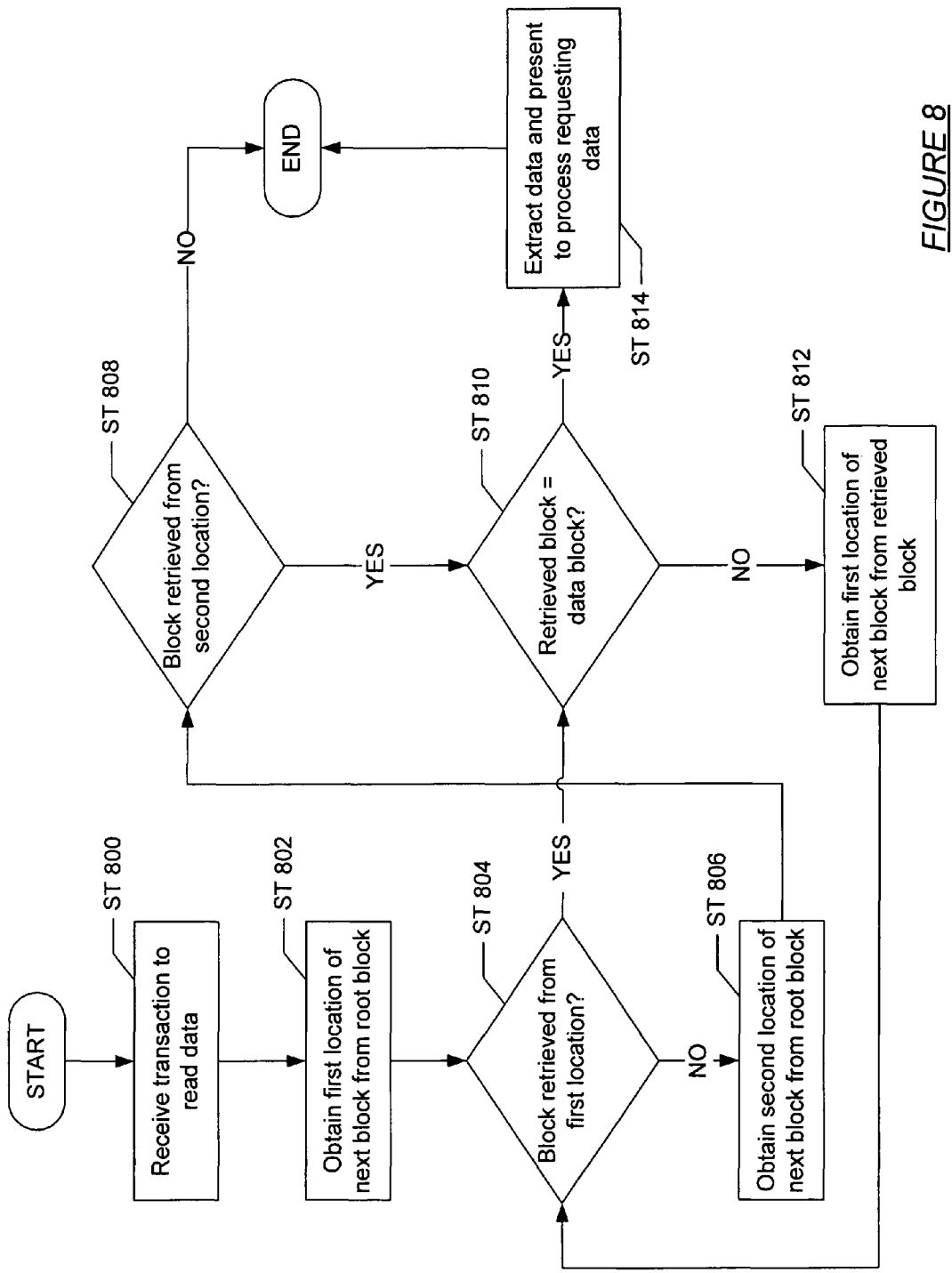
FIG. 8 shows a flow chart in accordance with an embodiment of the invention.

FIG. 8 shows a flow chart for reading indirect blocks replicated using a double-wide policy in accordance with one embodiment of the invention. Initially, a transaction to read data is received (Step 800). Subsequently, a first location of the next block is obtained from the root block (Step 802). More specifically, the first location of the next block is read from the block pointer in the root block. At this stage, a determination is made whether the next block is retrieved from the first location (Step 804). If the next block is retrieved from the first location obtained from the root block, then a determination is made whether the block retrieved is a data block (Step 810). If the retrieved block is a data block, then the data from the block is extracted and provided to the requesting process (Step 814). Alternatively, if the retrieved block is not a data block, then the retrieved block is an indirect block that references another block. In this case, the first location of the next block is obtained from the retrieved block (Step 812). At this stage, Steps 804-814 are repeated until the data block is obtained.

Returning to Step 804 in FIG. 8, if the next block is not retrieved from the first location, then the second location of the next block is obtained from the root block (Step 806). For example, the disk storing the block at the first location may be corrupted, offline, failed, etc., such that the block may not be retrieved. In this case, because the indirect block is replicated using the double-wide policy, and a mirrored location of the indirect block is stored in the root block, the second location of the indirect block can be obtained from the root block. Subsequently, a determination is made as to whether the block is retrieved from the second location of the next block (Step 808). If the next block is retrieved from the second location, then a determination is made whether the retrieved block is the data block (Step 810). If the retrieved block is the data block, then the data is extracted and provided to the requesting process (Step 814). Otherwise, Steps 804-814 are repeated until the data block is retrieved.

Those skilled in the art will appreciate that some retrieved indirect blocks may not store more than one location in its block pointer. For example, if a retrieved block is an indirect block that references a data block, then the retrieved indirect block may not store more than one location for the data block (which is not replicated using a double-wide policy). Thus, in this case, the data block would be obtained from the location stored in the retrieved block and the process ends.

In one embodiment of the invention, even if a given block is retrieved from disk, if the retrieved block is corrupted, then the process may attempt to obtain the block using the second location.

Figure 9:
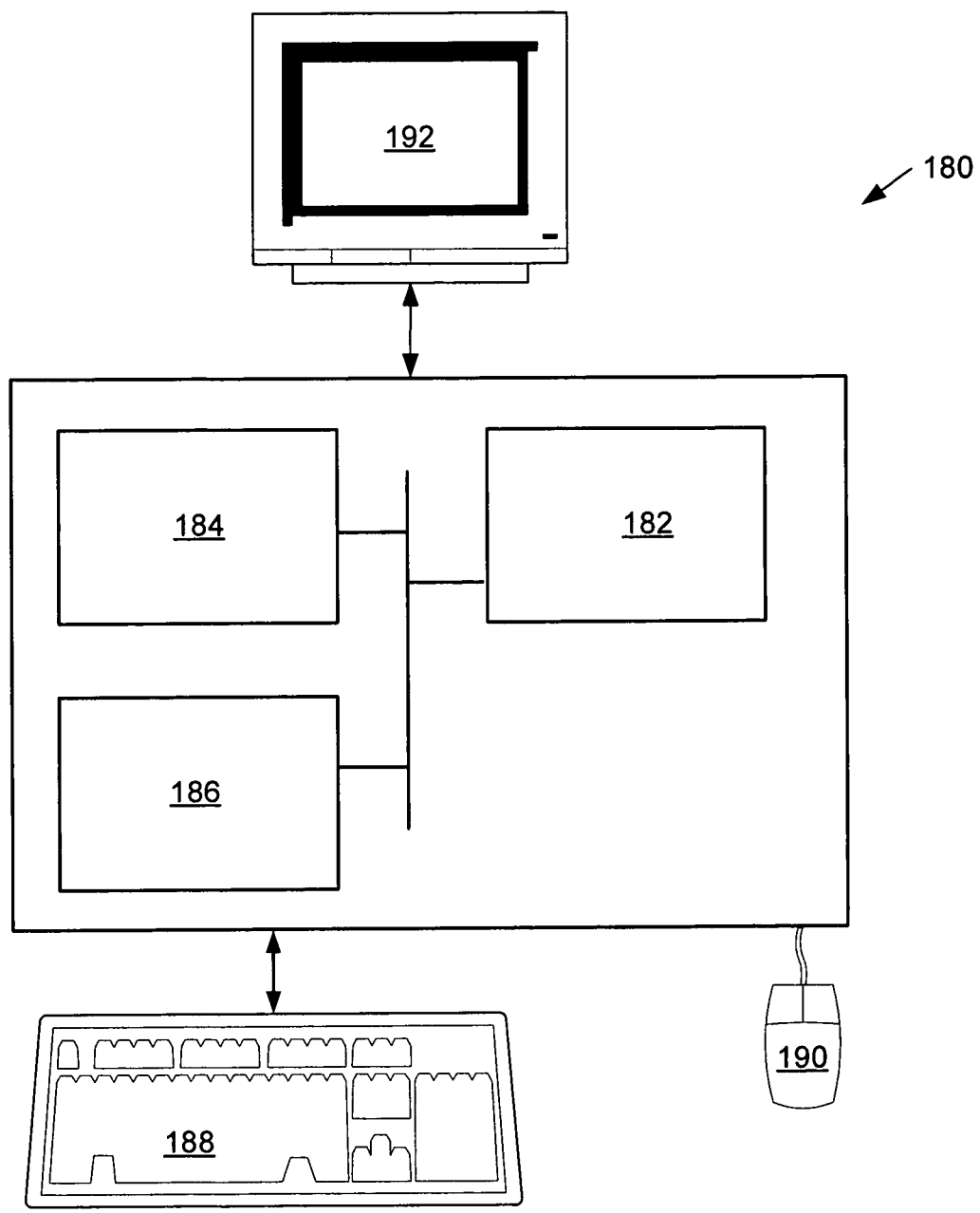
FIG. 9 shows a computer system in accordance with an embodiment of the invention.

The invention may be implemented on virtually any type of computer regardless of the platform being used. For example, as shown in FIG. 9, a networked computer system (180) includes a processor (182), associated memory (184), a storage device (186), and numerous other elements and functionalities typical of today's computers (not shown). The networked computer system (180) may also include input means, such as a keyboard (188) and a mouse (190), and output means, such as a monitor (192). The networked computer system (180) is connected to a local area network (LAN) or a wide area network (e.g., the Internet) (not shown) via a network interface connection (not shown). Those skilled in the art will appreciate that these input and output means may take other forms. Further, those skilled in the art will appreciate that one or more elements of the aforementioned computer (180) may be located at a remote location and connected to the other elements over a network. Further, the invention may be implemented on a distributed system having a plurality of nodes, where each portion of the invention (e.g., the storage pool, the SPA, the DMU, etc.) may be located on a different node within the distributed system. In one embodiment of the invention, the node corresponds to a computer system. Alternatively, the node may correspond to a processor with associated physical memory.

Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for storing a data block in a storage pool, comprising:
   receiving a write operation for the data block;
   writing the data block into the storage pool;
   determining a first indirect block to store in the storage pool, wherein the first indirect block comprises a first block pointer that references the data block;
   writing the first indirect block to a first location in the storage pool;
   creating a copy of the first indirect block;
   writing the copy of first indirect block to a second location in the storage pool, wherein the copy of the first indirect block comprises a second block pointer that references the data block; and
   writing a second indirect block into the storage pool, wherein the second indirect block comprises a third block pointer that references both the first indirect block and the copy of the first indirect block.

2. The method of claim 1, further comprising:
   computing a number of physical blocks to obtain an allocation size for the first indirect block.

3. The method of claim 2, further comprising:
   allocating rows corresponding to the allocation size to obtain a set of allocated rows for writing the first indirect block, wherein writing the first indirect block comprises writing the first indirect block to the set of allocated rows column-first.

4. The method of claim 1, wherein the data block, the first indirect block, and the copy of the first indirect block correspond to a portion of a hierarchical tree structure representing a file.

5. The method of claim 4, wherein the first indirect block and the copy of the first indirect block store metadata associated with the file.

6. A system, comprising:
   a storage pool comprising:
      a plurality of child blocks, wherein each of the plurality of child blocks comprises one selected from the group consisting of a data block and an indirect block, wherein each of the indirect blocks references at least one of the plurality of child blocks; and
      a parent block referencing at least one indirect block; and
   a storage pool allocator configured to store the parent block and the plurality of child blocks,
   wherein the at least one indirect block is stored in a first location and a copy of the at least one indirect block is stored in a second location in the storage pool,
   wherein the at least one indirect block references a data block,
   wherein the data block is one of the plurality of child blocks,
   wherein the copy of the at least one indirect block references the data block, and
   wherein the first location and the second location are stored in a single block pointer of the parent block referencing the at least one indirect block.

7. The system of claim 6, wherein the storage pool comprises a plurality of disks for storing the plurality of child blocks and the parent block.

8. The system of claim 7, wherein the first location resides on a first one of the plurality of disks and the second location resides on a second one of the plurality of disks.

9. A method for reading data in a storage pool, comprising:
obtaining a first location of a first indirect block from a block pointer of a parent block; determining whether the first indirect block can be retrieved from the first location; when the first indirect block cannot be retrieved from the first location:
  obtaining a second location of the first indirect block from the block pointer of the parent block, wherein the second location comprises a copy of the first indirect block; and
  retrieving the first indirect block from the second location, and
retrieving the first indirect block from the first location, when the first indirect block can be retrieved from the first location,
wherein the first indirect block comprises a first block pointer referencing a child block, and the copy of the first indirect block comprises a second block pointer referencing the child block.

10. The method of claim 9, wherein the child block comprises one selected from the group consisting of a data block and a second indirect block.

11. The method of claim 10, further comprising:
when the first and second block pointer reference the data block:
  retrieving the at least one data block using one of the first block pointer in the first indirect block and the second block pointer in the copy of the first indirect block; and
  extracting and presenting data stored in the data block to a requesting process.

12. The method of claim 10, further comprising:
when the first and second block pointer reference the second indirect block and when the first indirect block cannot be retrieved from the first location:
  obtaining a first location of the second indirect block from the second block pointer of the copy of the first indirect block;
  determining whether the second indirect block can be retrieved from the first location;
  when the second indirect block cannot be retrieved from the first location:
    obtaining a second location of the second indirect block from the second block pointer of the copy of the first indirect block; and
    retrieving the second indirect block from the second location, and
  retrieving the second indirect block from the first location, when the second indirect block can be retrieved from the first location.

13. The method of claim 9, wherein the first location resides on a first disk and the second location resides on a second disk.

14. The method of claim 9, wherein the indirect block stores metadata associated with a file.

15. The method of claim 9, wherein the first indirect block and the copy of the first indirect block store metadata associated with the file.

* * * * *

UNITED STATES PATENT AND TRADEMARK OFFICE
CERTIFICATE OF CORRECTION

PATENT NO. : 7,743,225 B2
APPLICATION NO. : 11/406590
DATED : June 22, 2010
INVENTOR(S) : Jeffrey S. Bonwick et al.

It is certified that error appears in the above-identified patent and that said Letters Patent is hereby corrected as shown below:

On the Title Page 2, Item (56) under "Other Publications", line 32, delete "Angrawal," and insert -- Agrawal, --, therefor.

In column 1, line 15, delete "flied" and insert -- field --, therefor.

In column 8, line 9, delete "with in" and insert -- within --, therefor.

In column 11, line 33, in claim 11, delete "pointer" and insert -- pointers --, therefor.

Signed and Sealed this
Twenty-sixth Day of July, 2011

David J. Kappos
*Director of the United States Patent and Trademark Office*